(12) United States Patent
Ghidotti

(10) Patent No.: US 6,169,267 B1
(45) Date of Patent: Jan. 2, 2001

(54) SIMPLIFIED COMMAND AND CONTROL DEVICE FOR A COUPLING-WELDING MACHINE FOR METAL PIPES IN WHICH THE MACHINE IS INSERTED

(75) Inventor: Luigi Ghidotti, Arcene (IT)

(73) Assignee: PSI Pipeline Service S.A. (CH)

( * ) Notice: Under 35 U.S.C. 154(b), the term of this patent shall be extended for 0 days.

(21) Appl. No.: 09/101,722

(22) PCT Filed: Dec. 1, 1997

(86) PCT No.: PCT/EP97/06709

§ 371 Date: Jul. 15, 1998

§ 102(e) Date: Jul. 15, 1998

(87) PCT Pub. No.: WO98/25726

PCT Pub. Date: Jun. 18, 1998

(30) Foreign Application Priority Data

Dec. 9, 1996 (IT) ............................. MI96A2571

(51) Int. Cl.[7] ................. B23K 9/12; B23K 9/10
(52) U.S. Cl. ....................... 219/125.11; 219/132
(58) Field of Search .................. 219/125.11, 132; 285/21; 156/273.3

(56) References Cited

U.S. PATENT DOCUMENTS

| 5,148,000 | * | 9/1992 | Tews .................. 219/125.11 |
| 5,276,305 | * | 1/1994 | Hsien .................... 219/132 |
| 5,433,484 | * | 7/1995 | Ewen et al. ............... 285/21 |
| 5,529,656 | * | 6/1996 | Ewen et al. .......... 156/273.9 |

* cited by examiner

Primary Examiner—Patrick Ryan
Assistant Examiner—Anjan Dey
(74) Attorney, Agent, or Firm—Steinberg & Raskin, P.C.

(57) ABSTRACT

A command and control device for a coupling-welding machine for metal pipes within which the coupling-welding machine is positioned, the machine being movable within the pipe and being operable to weld the metal pipes together. The command and control device including a control unit associated with the machine, a command unit external to the pipe and an energy source connected to an external power supply by a power line, the control unit being cooperatively interconnected with command unit by the same power line.

11 Claims, 2 Drawing Sheets

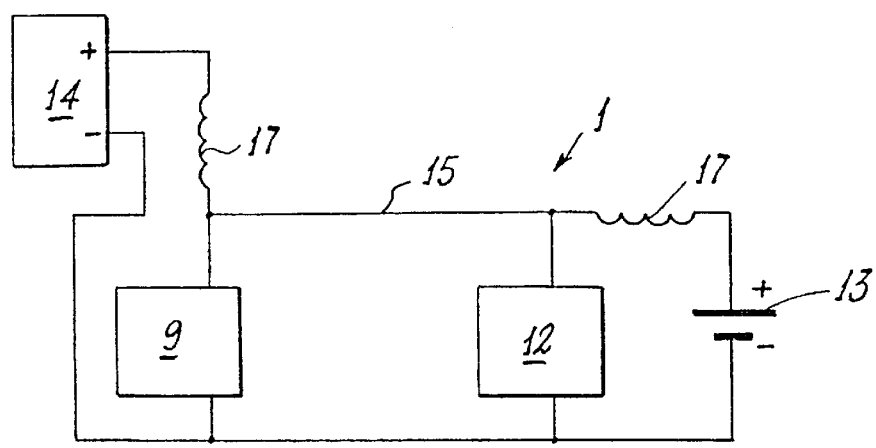
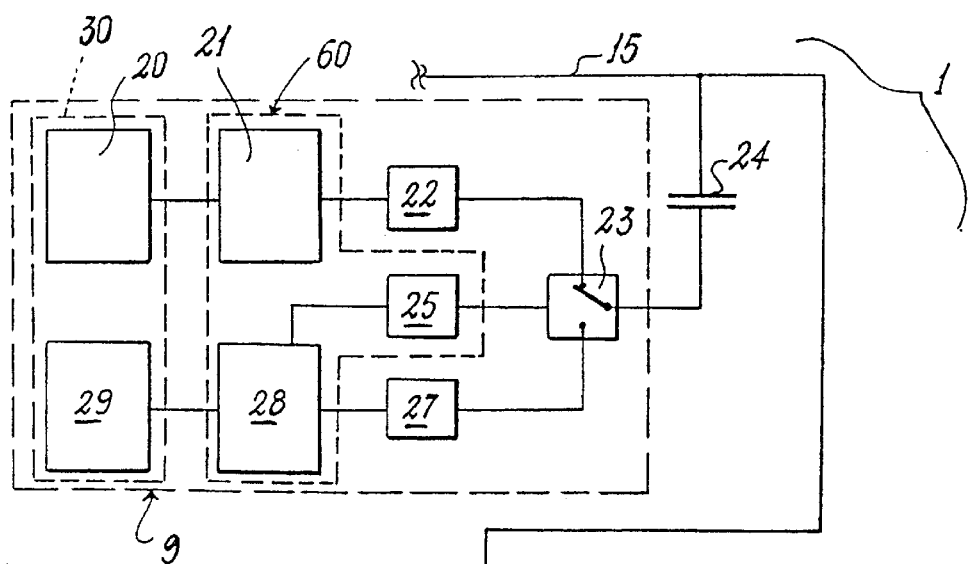
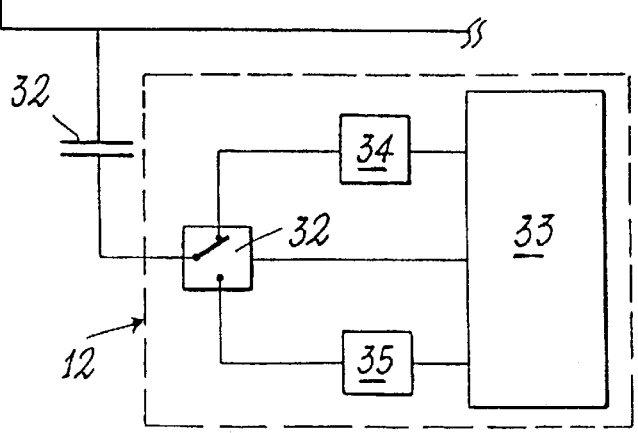
Fig. 1
Fig. 2

SIMPLIFIED COMMAND AND CONTROL DEVICE FOR A COUPLING-WELDING MACHINE FOR METAL PIPES IN WHICH THE MACHINE IS INSERTED

FIELD OF THE INVENTION

The present invention relates to a command and control device, and in particular, to a command and control device for a coupling-welding machine for metal pipes.

BACKGROUND OF THE INVENTION

A coupling-welding machine for metal pipes (or coupling machine for brevity) is known to comprise a device which enables the movement of the machine to be commanded and controlled within the pipe, and the welding heads carried by said machine to be activated. The device comprises a remote commanding unit external to the pipe in which the machine is located, and connected to a microprocessor unit associated with the machine to control the execution of the numerous operations which the machine performs. These operations comprise: moving the coupling machine within the pipe, aligning the machine with one end of the pipe, clamping appropriate known parts of the machine to the end of that pipe and to a pipe brought close to that end, positioning the welding heads in predefined positions within the pipes to weld them together, providing power to at least one welding cable, and providing the necessary shielding for the gas generated during said welding. All these operations must be constantly monitored to ensure that they are properly carried out. This is done by the microprocessor control unit associated with the coupling machine, said unit being controlled by the remote commanding unit external to the pipe. This latter unit carries a plurality of analog or digital visual display devices positioned on an interface on which there are also provided keys, levers or similar command members by which an operator can control and suitably intervene in the operation of the coupling machine.

The connection between the control unit and the commanding unit is usually made by a bundle of electrical connectors (enclosed within a single tubular sheath of a certain diameter) connected to the various interface members.

A coupling machine of the aforesaid type has to be able to operate in any weather and temperature condition. It has however been found that the use of such connections presents various problems if the temperature of the environment in which the machine operates falls considerably below 0° C., for example below −45° C. Under these conditions, if the sheath becomes bent during the machine movements, its contained electric cables break because they become fragile at very low temperature. This results in considerable problems for the operators who have to replace them.

Moreover, the bundle of connection cables between the control unit and the commanding unit is of considerable weight and large overall size, considerably penalizing its movement and replacement, particularly (but not only) when the aforesaid breakage problems arise.

U.S. Pat. No. 5,148,000 describes a device for controlling a coupling machine, of the type comprising a commanding unit and control unit of microprocessor type in which these units are connected together by a serial connection (or at least two cables enclosed in a single sheath). With this solution an external microprocessor holds in its memory all the machine operating steps (program). Other microprocessors are associated with the machine, these also containing said operating steps in their memory. This control system, defined as distributed processing, partly solves the weight and size problems of the aforesaid arrangements in that the said cable bundle is replaced by only two electric cables. This known arrangement is however still affected by low temperature. In this respect, if the sheath containing these cables is bent, the cables can easily break because of their fragility induced by said temperature. Moreover, this known arrangement uses a large number of components to the detriment of its cost. The arrangement is also of poor reliability precisely because of the large number of components.

OBJECTS AND SUMMARY OF THE INVENTION

An object of the invention is to provide an improved command and control device for a metal pipe coupling machine.

A particular object of the invention is to provide a device of the stated type in which electric cables specifically provided for the purpose are not used for connecting together the commanding unit and control unit, so overcoming the problem of low-temperature breakage of the connection cables used in arrangements of the state of the art.

These and further objects are attained by a device in accordance with the accompanying claims.

According to the invention, the connection between the commanding unit and control unit is made via the cable (normally provided in the command and control device of a coupling-welding machine) by which the battery energy source carried by the coupling machine is powered. This cable, of relatively large diameter, and normally available commercially, is able to flex without breaking, even at very low temperature (−50° C. and beyond).

BRIEF DESCRIPTION OF THE DRAWINGS

The present invention will be more apparent from the accompanying drawing, which is provided by way of non-limiting example and on which:

FIG. 1 is a general block diagram of the device of the invention;

FIG. 2 is a detailed block diagram of the device of FIG. 1;

DETAILED DESCRIPTION OF THE PREFERRED EMBODIMENTS

Figure 3:
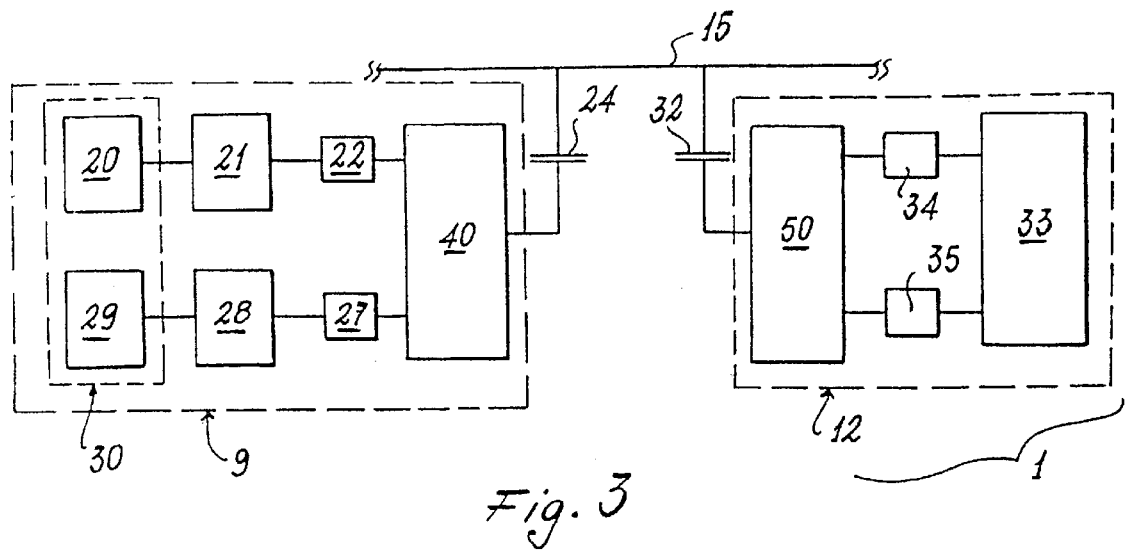
FIG. 3 is a detailed block diagram of a modification of the device of FIG. 1.
Figure 4:
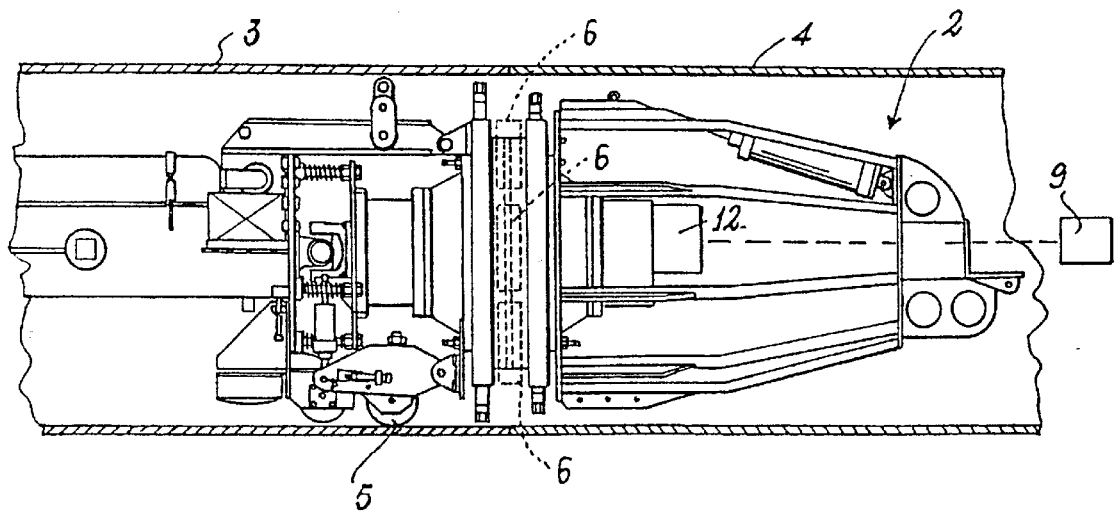
FIG. 4 is a schematic view of a coupling machine provided with the device of the invention.

With reference to said figures, the device of the invention is indicated overall by the reference numeral 1 and is associated with a coupling machine 2 for metal pipes 3 and 4. The machine is moved within these pipes by drive means 5 and is provided with welding means 6 for joining together two metal pipes which have been previously brought into contact. The machine 2 is known per se and will not be further described.

The operative functions of the machine 2 are actuated and controlled by the device 1. In known manner, it comprises a unit 9 for actuating (by an operator) the operative functions of the machine 2. The unit 9 is always external to the pipe within which the coupling machine moves, so as to be able to be used by an operator.

The machine 2 also supports a control unit 12 which directly and independently superintends the operation of the various operating parts of the machine 2 in accordance with well defined operating steps. This unit is of microprocessor type and, for example, is the only command and control unit associated with the coupling-welding machine.

Finally, in known manner the machine 2 carries a battery 13 allowing the usual electrical or electropneumatic members (valves, motors, welders, etc.) associated with the coupling machine to be independently powered electrically. The battery 13 is removably connected to an electrical feed or battery charging circuit 14 external to the machine 2 via a supply cable 15.

In order for the coupling machine to operate, the unit 9 and the unit 12 must be connected together, so that data can be exchanged between them. More specifically, the unit 9 must be able to inform the unit 12 of the state of pushbuttons, selectors and switches present on its interface so that the control unit 12 is able to execute the operator's commands. Furthermore, the commanding unit 9 must be able to receive from the unit 12 data to be displayed on appropriate displays present on said interface (generally three in number) to keep the operator informed of the machine operation.

According to the invention, this connection is made not by providing a dedicated connection cable, but instead via the power cable 15 which connects the battery charger 14 to the battery 13.

Said cable 15 has the characteristic of being bendable while at the same time supporting this bending at low temperature (of −50° C. and beyond) without breaking. Moreover, this cable is already provided on every coupling machine, so that its presence does not complicate the machine structure or operation.

To enable the cable 15 to be used for connecting the unit 9 to the unit 12, upstream and downstream of the unit connections to the cable there are provided filtering members 17 (for example inductors) to prevent the battery 13 and battery charger 14 short-circuiting the signals transmitted between these units, while still allowing passage of the charging current. Additionally, for the cable to be used for this purpose, preferably the said data transmission (serial) is by high-frequency modulated signals, for example exceeding 100 kHz, and preferably between 180 and 250 kHz. This is to enable the transmission signal to be rejected by each filter or inductance 17, whereas the charging direct current encounters no resistance and can reach the battery 13.

Finally, advantageously the transmission signal has zero mean value to prevent it discharging across the battery and the battery charger.

With this method of data transmission, the unit 9 and the unit 12 preferably have the configurations of FIGS. 2 and 3. In FIG. 2, the device 1 is of the type in which the connection between the units 9 and 12 is bidirectional of alternate single direction (ie half duplex), whereas in the device 1 of FIG. 3 these units are connected together bidirectionally for simultaneous double direction (ie full duplex).

More specifically, with reference to FIG. 2 (showing a half duplex connection), the commanding unit 9 comprises a command block 20 connected to a parallel-serial converter 21. It is able to convert the state of the components (pushbuttons, 2-way switches, etc.) of the block 20 into a train of digital pulses, advantageously encoded, said state being monitored periodically (eg. every 40 msec.). The converter 21 is connected to a modulator 22 which, on the basis of the pulse train leaving said converter, generates an amplitude-modulated square wave carrier of high frequency (eg. 200 kHz). The modulator hence generates the output signal (in voltage) which, on the basis of the position of a static switch 23, is fed along the cable 15 after passing through a capacitor 24 to interface the cable with the single alternating component of this signal. The switch 23 is actuated by a driver member 25 itself controlled by encoded signals originating from the control unit 12, which decides the direction of the connection, ie towards the unit 9 if the unit has to feed its data to it, or vice versa if it has to receive data. The member 25 is therefore substantially a passive member which receives commands from the unit 12, and acts on the switch 23 only on the basis of these. This latter is then connected in series with a demodulator 27, a serial/parallel converter 28 and a display block 29. This block and the said block 20 form part of the said interface (now indicated by 30). The demodulator 27, the converter 28 and the block 29 are arranged to receive, demodulate, convert and display the signals originating from the unit 12 along the cable 15.

Preferably the member 25, the converter 21 and the converter 28 are combined into a single data transmission handling unit 60 which is totally passive and under the control of the control unit 12.

The converter 28 is connected to the member 25 to enable this member to accept the signals from the control unit 12.

This latter is connected to the cable 15 via a decoupling capacitor 31, similar to that 24 already mentioned. The capacitor is connected to a directing or 2-way switch 32 which determines (in a manner similar to 23) the direction of signal transmission along the cable 15. The switch 32 is driven by a microprocessor circuit 33 which controls all the functions of the machine 2. It generates the pulse train (amplitude modulated, with high frequency carrier, by a modulator 34) transmitted towards the unit 9 and decodes the pulse train (demodulated by a demodulator 35) received from the commanding unit. The circuit 33 determines the direction of the data flow along the cable 15 by operating on the switch 32 connected to the modulator 34 and demodulator 35.

The operation of the device 1 is clear from the description of FIG. 2 and will therefore not be further described.

In FIG. 3, in which parts corresponding to those of FIG. 2 are indicated by the same reference numerals, the device 1 is shown in the full duplex configuration. In this case, in contrast to the device of FIG. 2, the signal of one direction (transmitted) must be distinguished from the signal of the other direction (received) by modulating, for example, the two signals with two different sinusoidal carriers with conveniently separated frequencies. This is achieved by providing within each unit 9 and 12 a suitable filtering member (40 and 50 respectively) to replace the corresponding 2-way switch 23 and 32 (and the member 25).

The operation of the device 1 of FIG. 3 is similar to that of the device of FIG. 2. In this case the signals emitted by the unit 9 modulated by a suitable carrier are fed to the unit 12 via the member 40. In known manner this latter clips the signals fed to the demodulator 27 and consequently nothing happens in the block 29. The signals directed along the cable 15 towards the unit 12 are received by the filtering member 50 which in known manner feeds them to the demodulator 35 and hence to the microprocessor circuit 33. The member 50 prevents (by nullifying them) these signals reaching the modulator 34.

The opposite occurs in the case of the signal fed by the unit 12 to the unit 9. When both signals (that transmitted by the unit 9 to the unit 12 and that received from the unit 12) are present in the cable 15, the filtering members 40 and 50 suitably direct the signals towards the corresponding demodulators 35 or 27 to prevent signal superimposing.

The device of the invention is simpler than known devices. Moreover the absence of dedicated data transmission lines (which are fragile at low temperature) makes the device more reliable, lighter and less bulky than known devices.

Two embodiments of the invention have been described. Others are however possible in the light of the present description. These other embodiments are to be considered as falling within the scope of the present document.

What is claimed is:

1. A command and control device for a coupling-welding machine (2) for metal pipes (3, 4) within which said machine is positioned, said machine (2) being movable within the pipe and provided with welding means (6) for joining different pieces (3, 4) of said pipe together, and with drive means (5) enabling it to move independently within the pipe, the operation of said welding means (6) and drive means (5) being controlled by control means (12) associated with the machine (2), said control means (12) being connected to commanding means (9) which are external to the pipe and which actuate the operation of the welding means (6) and drive means (5), the machine (2) being provided with an energy source (13) which can be powered from the exterior of the pipe by charging means (14) connected to said source (13) via a corresponding power line (15), said device being characterised in that the control means (12) are connected to the commanding means (9) via the power line (15) for the energy source (13), along said line (15) said commanding means (9) feeding control commands to the control means (12) and receiving from these latter means return signals enabling an operator to actuate and control the coupling machine.

2. A device as claimed in claim 1, characterised in that the commanding unit (9) is connected to the power line (15) for the energy source (13) associated with the coupling machine (2) downstream of first filtering means (17), the control unit (12) being connected to said line (15) upstream of second filtering means (17) provided before said source (13) along said line, said first and second filtering means (17) being arranged to act on andnullify the signals transmitted between said commanding means (9) and control means (12), while allowing passage of the electric current fed by the charging means (14) towards the energy source (13) carried by the machine (2).

3. A device as claimed in claim 2, characterised in that the signals transmitted between the commanding means (9) and control means (12) are signals of such a frequency as to be rejected by the first and second filtering means (17).

4. A device as claimed in claim 1, characterised in that the signals transmitted between the commanding means (9) and the control means (12) have zero mean value.

5. A device as claimed in claim 1, characterised in that the signals transmitted between the commanding means (9) and the control means (12) are digital signals.

6. A device as claimed in claim 1, characterised in that signal transmission between the commanding means (9) and the control means (12) is bidirectional of alternate single direction or half duplex.

7. A device as claimed in claim 1, characterised in that signal transmission between the commanding means (9) and the control means (12) is bidirectional with simultaneous double direction or full duplex.

8. A device as claimed in claim 1, characterised in that a filtering member (24, 32) is positioned between the power line (15) and the commanding means (9) and between said line and the control means (12).

9. A device as claimed in claim 1, characterised in that the control means (12) comprise a microprocessor circuit (33), this latter controlling signal exchange between the commanding means (9) and the control means (12).

10. A device as claimed in claim 1, characterised in that the commanding means (9) comprises a command block (20) having a plurality of components, converting means (21) for converting a state of said components of said block into a train of digital pulses and a modulator (22) for receiving said digital pulses, generating output signals based on said digital pulses and feeding said output signals to the control means (12) and an arrangement of components, comprising a demodulator (27), a converter (28) and a display block (29), which act as a means for receiving signals from the control means (12), said feeding and receiving means being connected to switching means (23) which connect them alternately to the power line (15), said switching means (23) being controlled and driven by the control means (12).

11. A device as claimed in claims 1 and 2, characterised in that the commanding means (9) and control means (12) comprise filtering means (40, 50) to enable full duplex transmission.

* * * * *